United States Patent
Chiu et al.

(10) Patent No.: US 10,419,567 B2
(45) Date of Patent: Sep. 17, 2019

(54) CLIENT TERMINAL OF AUDIO DEVICE REDIRECTION SYSTEM AND AUDIO DEVICE REDIRECTION METHOD

(71) Applicant: ELITE SILICON TECHNOLOGY INC., Hsinchu (TW)

(72) Inventors: Tzu-Chiang Chiu, Tainan (TW); Chin-Yi Chiang, New Taipei (TW)

(73) Assignee: ELITE SILICON TECHNOLOGY INC., Hsinchu (TW)

( * ) Notice: Subject to any disclaimer, the term of this patent is extended or adjusted under 35 U.S.C. 154(b) by 87 days.

(21) Appl. No.: 15/465,568

(22) Filed: Mar. 21, 2017

(65) Prior Publication Data

US 2018/0278707 A1 Sep. 27, 2018

(51) Int. Cl.
| | |
|---|---|
| *H04L 29/08* | (2006.01) |
| *G06F 13/42* | (2006.01) |
| *G06F 13/38* | (2006.01) |
| *H04L 29/06* | (2006.01) |

(52) U.S. Cl.
CPC ........ *H04L 67/2814* (2013.01); *G06F 13/385* (2013.01); *G06F 13/4282* (2013.01); *H04L 67/34* (2013.01); *H04L 67/42* (2013.01)

(58) Field of Classification Search
CPC . H04L 67/2814; H04L 67/42; G06F 9/45504; G06F 13/385; G06F 13/4282; G04L 67/34
USPC ........................................................ 709/203
See application file for complete search history.

(56) References Cited

U.S. PATENT DOCUMENTS

| | | | | |
|---|---|---|---|---|
| 8,010,630 | B2 * | 8/2011 | Barreto | H04L 29/08846 709/219 |
| 8,438,319 | B1 * | 5/2013 | Edney | G06F 5/00 710/106 |
| 8,893,013 | B1 * | 11/2014 | Groves | G06F 3/1454 715/740 |
| 9,582,444 | B1 * | 2/2017 | Kumar | G06F 13/385 |
| 9,807,177 | B2 * | 10/2017 | Raju | H04L 67/141 |
| 10,313,448 | B2 * | 6/2019 | Vajravel | H04L 67/141 |
| 2012/0158822 | A1 * | 6/2012 | Dai | G06F 9/54 709/203 |
| 2012/0246355 | A1 * | 9/2012 | Scragg, Jr. | G06F 9/4445 710/33 |
| 2014/0029764 | A1 * | 1/2014 | Park | H03G 3/002 381/104 |

(Continued)

FOREIGN PATENT DOCUMENTS

| | | |
|---|---|---|
| CN | 102368231 A | 3/2012 |
| CN | 104391672 A | 3/2015 |

(Continued)

*Primary Examiner* — Nicholas R Taylor
*Assistant Examiner* — Chong G Kim
(74) *Attorney, Agent, or Firm* — Winston Hsu

(57) ABSTRACT

A client terminal of an audio device redirection system includes: a storage device and a processor. The storage device stores a program code. When loaded and executed by the processor, the program code instructs the processor to perform the following steps: virtualizing an audio device of the client terminal as a virtual USB audio device on the client terminal; and redirecting the virtual USB audio device to a server terminal of the audio device redirection system for a virtual desktop infra-structure (VDI) service via a network interface based on a USB redirection protocol.

16 Claims, 3 Drawing Sheets

(56) References Cited

U.S. PATENT DOCUMENTS

| | | | | |
|---|---|---|---|---|
| 2014/0179234 A1* | 6/2014 | Lee | ...................... | H04W 76/023 |
| | | | | 455/41.2 |
| 2014/0317418 A1* | 10/2014 | Lin | ...................... | H04L 63/0471 |
| | | | | 713/190 |
| 2014/0330978 A1* | 11/2014 | Venkatesh | ......... | H04L 29/08567 |
| | | | | 709/226 |
| 2015/0264513 A1* | 9/2015 | Ryazanov | ................ | G06F 3/162 |
| | | | | 710/70 |
| 2016/0188356 A1* | 6/2016 | Ramasamy | ......... | G06F 9/45558 |
| | | | | 718/1 |
| 2016/0328333 A1 | 11/2016 | Dong | | |
| 2017/0031852 A1* | 2/2017 | Vajravel | ................... | G06F 13/36 |
| 2017/0061145 A1* | 3/2017 | Vajravel | .............. | G06F 21/6218 |
| 2017/0063832 A1* | 3/2017 | Vajravel | ................ | H04L 63/083 |
| 2017/0068627 A1* | 3/2017 | Vajravel | ................. | G06F 13/385 |
| 2017/0068635 A1* | 3/2017 | Vajravel | .............. | G06F 13/4282 |
| 2017/0109301 A1* | 4/2017 | Venkatesh | ............... | G06F 13/20 |
| 2017/0111455 A1* | 4/2017 | Raju | ...................... | H04L 67/141 |
| 2017/0264649 A1* | 9/2017 | Sonar | ................. | H04L 65/1069 |
| 2017/0286681 A1* | 10/2017 | Vajravel | ................ | G06F 21/566 |
| 2017/0308492 A1* | 10/2017 | Vajravel | ................ | G06F 13/385 |
| 2017/0310790 A1* | 10/2017 | Vajravel | ................. | H04L 67/42 |
| 2017/0339234 A1* | 11/2017 | Vajravel | ................ | H04L 67/141 |
| 2018/0267918 A1* | 9/2018 | Raju | ...................... | G06F 13/385 |

FOREIGN PATENT DOCUMENTS

| | | |
|---|---|---|
| TW | 201104555 A1 | 2/2011 |
| TW | I435319 B | 4/2014 |

* cited by examiner

CLIENT TERMINAL OF AUDIO DEVICE REDIRECTION SYSTEM AND AUDIO DEVICE REDIRECTION METHOD

BACKGROUND OF THE INVENTION

1. Field of the Invention

The present invention relates to an audio device redirection system and an associated method.

2. Description of the Prior Art

Virtual desktop infrastructure (VDI) is a desktop virtualization approach in which a desktop operating system runs and is managed in a data center (server terminal). The desktop image is delivered over a network to an endpoint device (client terminal), allowing the user to interact with the server terminal-installed OS and its applications as if they were running locally. The client terminal may be a traditional PC, a thin PC or a mobile device. This approach can have many benefits, depending on the type of VDI deployed. Because few actual computing takes place at the client terminal, IT departments may be able to extend the lifespan of otherwise obsolete PCs by repurposing them as VDI clients. Further, as all data are stored in the server terminal instead of the client terminal, VDI has significant security benefits.

Universal Serial Bus (USB) redirection is a technology that allows a client to plug an external device into a USB port on their client terminal and access the device from within a remote desktop or application. The redirection process involves forwarding the USB device's functionality from the client terminal to the server terminal over the network. Organizations supporting USB redirection on virtual desktops must use servers that are compatible with the remote display protocol in its VDI software. Common USB devices that are candidates for redirection include flash and other storage drives, smart card devices, printers, and image devices. For some non-USB devices such as audio devices, however, when redirected to the server terminal they will consume a lot of computing power if virtual audio devices are implemented on the server terminal, especially when lots of client terminals interact with the server terminal for the VDI service.

SUMMARY OF THE INVENTION

One of the objectives of the present invention is therefore to provide a client terminal of an audio device redirection system and an audio device redirection method to solve the abovementioned problem.

According to an embodiment of the present, a client terminal of an audio device redirection system is disclosed, wherein the client terminal comprises a storage device and a processor. The storage device is arranged to store a program code. When loaded and executed by the processor, the program code instructs the processor to perform the following steps: virtualizing an audio device of the client terminal as a virtual USB audio device on the client terminal; and redirecting the virtual USB audio device to a server terminal of the audio device redirection system for a virtual desktop infra-structure (VDI) service via a network interface based on a USB redirection protocol.

According to an embodiment of the present invention, an audio device redirection method of a client terminal is disclosed, comprising: virtualizing an audio device of the client terminal as a virtual USB audio device on the client terminal; and redirecting the virtual USB audio device to a server terminal of the audio device redirection system for a virtual desktop infra-structure (VDI) service via a network interface based on a USB redirection protocol.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
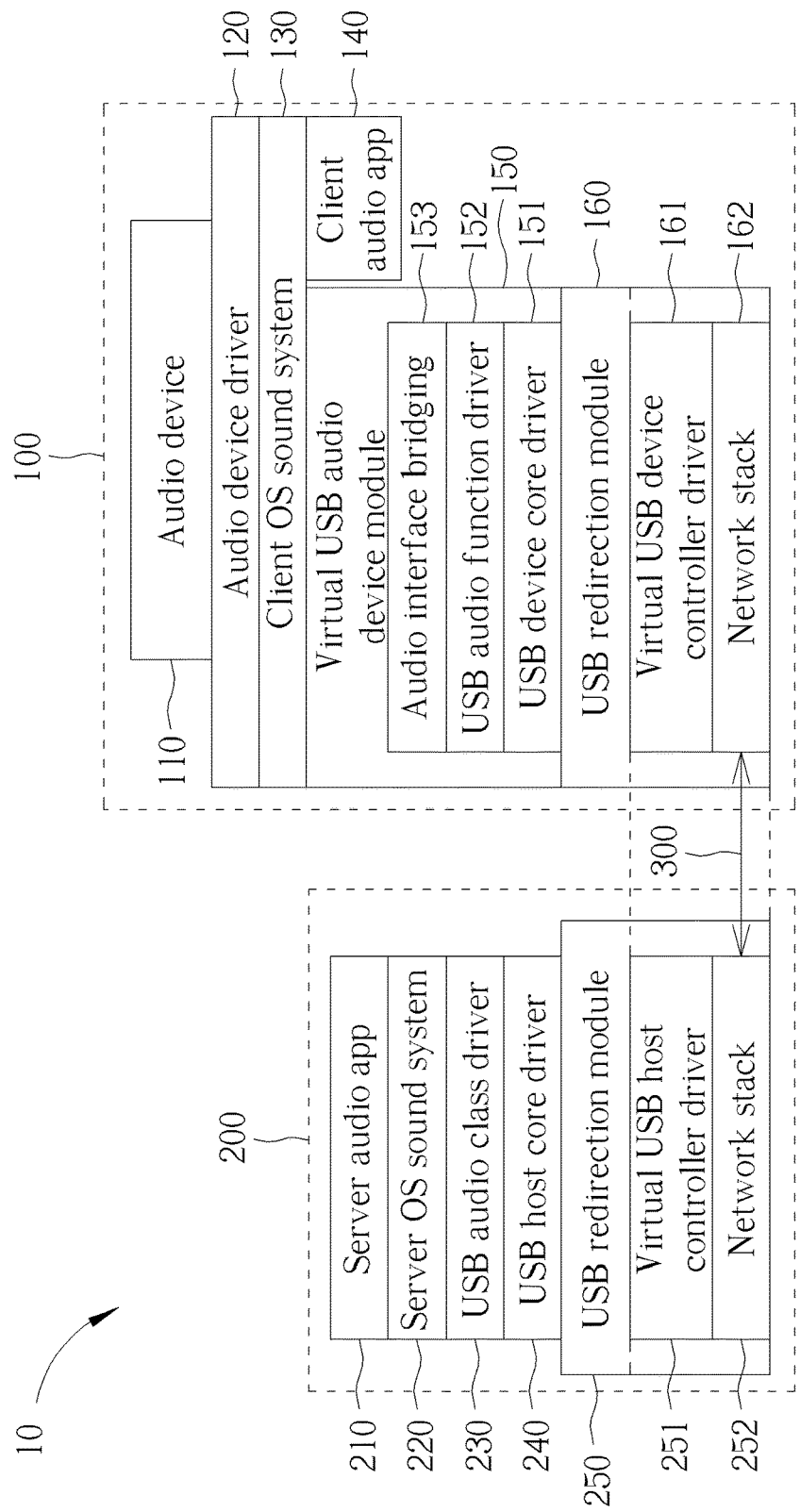
FIG. 1 is a diagram illustrating an audio device redirection system according to an embodiment of the present invention.

FIG. 1 is a diagram illustrating an audio device redirection system 10 according to an embodiment of the present invention. The audio device redirection system 10 comprises a client terminal 100 and a server terminal 200, wherein the client terminal 100 interacts with the server terminal 200 via a network interface 300 for the VDI service. As shown in FIG. 1, the client terminal 100 comprises an audio device 110, an audio device driver 120, a client operating system (OS) sound system 130, a client audio application (app) 140, a virtual USB audio device module 150 and a USB redirection module 160. The audio device 110 comprises a microphone and a speaker (not shown in FIG. 1) for transmitting/receiving audio, wherein the audio device 110 is one function of a system-on-chip (SOC) device installed in the client terminal 100. The audio device driver 120 is a software driving program for driving the audio device 110. The client OS sound system 130 is a sound system of the OS of the client terminal 100. It should be noted that the client terminal 100 can be an electronic device such as a computer, a set-top box or a smart phone, and the OS of the client terminal 100 can be any type of OS and the present invention is not limited to one particular OS. In this embodiment, the OS of the client terminal 100 is an Android system. Therefore, the client OS sound system 103 can be a sound system of the Android system. The client audio app 140 is an application launched in the OS of the client terminal 100, wherein the client audio application 140 can be any application using the audio device 110. For example, the client audio application is an instant messenger application or a media player application; the virtual USB audio device module 150 is arranged to virtualize the audio device 100 of the client terminal 100 as a virtual USB audio device on the client terminal 100; and the USB redirection module 160 is arranged to redirect the virtual USB audio device to a server terminal of the audio device redirection system for the VDI service via a network interface 300 based on a USB redirection protocol.

It should be noted that the audio device driver 120, the client OS sound system 130, the client audio application 140, the virtual USB audio device module 150 and the USB redirection module 160 are implemented by software in this embodiment, but this is not a limitation of the present invention. In other embodiments, these modules can be implemented by hardware or firmware based on the designer's consideration. When implemented by software, the client terminal 100 can further comprise a storage device (not shown in FIG. 1), wherein a program code of the storage is arranged to store those modules.

As shown in FIG. 1, the server terminal 200 comprises a server audio application 210, a server OS sound system 220, a USB audio class driver 230, a USB host core driver 240 and a USB redirection module 250. The OS of the server terminal 200 can be any type of OS. In this embodiment, the OS of the server terminal 200 is a Linux system. Therefore, the server OS sound system 220 can be a sound system of the Linux system. The server audio application 210 is an application launched in the OS of the server terminal 200, wherein the server audio application 210 can be any application using the audio device 101. For example, the server audio application 200 is an instant messenger application or a media player application. The USB audio class driver 230 is a software driving program for driving the virtual USB audio device after the audio device 110 is virtualized by the virtual USB audio device module 150 and redirected by the USB redirection module 160 to the server terminal 200 via the network interface 300, and is further arranged to input/output the audio data based on the USB audio data format. In this embodiment, the USB audio class driver 230 can be a standard USB device driver for driving the virtual USB audio device. The USB host core driver 240 is arranged to perform device initialization, i.e. manage the plug-in and configuration process of the virtual USB audio device after the audio device 110 is virtualized by the virtual USB audio device module 150 and redirected by the USB redirection module 160 to the server terminal 200 via the network interface 300. The USB host core driver 240 is further arranged to manage USB Request blocks (URBs) sent by the USB audio class driver 230. The USB redirection module 250 comprises a virtual USB host controller driver 251 and a network stack 252, wherein the virtual USB host controller driver 251 is arranged to process the URBs managed by the USB host core driver 240 and send a USB input/output (I/O) request like an actual USB host controller. The network stack 252 is similar or identical to the network stack in the prior art; a detailed description is omitted here for brevity. The USB redirection module 250 of the server terminal 200 communicates with the USB redirection module 160 of the client terminal 100 based on a USB redirection protocol. In this embodiment, the USB redirection protocol is a USB Network Transmit Protocol developed by Elite Silicon Technology Inc. It should be noted that the type of USB redirection protocol is not limited in the present invention.

As shown in FIG. 1, the USB redirection module 160 comprises a virtual USB device controller driver 161 and a network stack 162, wherein the virtual USB device controller driver 161 is arranged to respond to the USB I/O request sent by the virtual USB host controller driver 251 in response to the virtual USB audio device, in order to finish the data exchange between the device and the server terminal 200. The network stack 162 is identical to the network stack 252 of the server terminal 200. The virtual USB audio device module 150 comprises a USB device core driver 151, a USB audio function driver 152 and an audio interface bridging module 153, wherein the USB device core driver 151 is arranged to respond to the USB host core driver 240 to finish the initialization of the virtual USB audio device, and the USB audio function driver 152 is arranged to receive an audio output data (speaker out) from the USB audio class driver 230 and transmit an audio input data (microphone in) to the server terminal 200 based on the USB audio data format. The audio interface bridging module 153 is arranged to receive the audio output data (speaker out) from the USB audio function driver 152 and transfer it to the client OS sound system 130, and also arranged to grab the audio input data (microphone in) from the audio device 110 and transfer it to the USB audio function driver 152. The audio interface bridging module 153 retrieves and transfers the audio data to/from the client OS sound system 130 via an application programming interface (API). It should be noted that the USB device core driver 151, the USB audio function driver 152 and the audio interface bridging module 153 are described as three different modules in the virtual USB audio device module 150 in this embodiment. In other embodiments, however, these three modules can be combined as only one or two modules or be divided into more than three modules with the same functions.

By virtualizing the audio device 110 as the virtual USB audio device on the client terminal 100 and redirecting it to the server terminal 200 for the VDI service, both terminals can use the audio device 110 for audio input/output at the same time. The client OS sound system 130 determines what audio can be played based on whose desktop is shown to the user on client terminal's display device. For example, assuming that the client terminal 100 runs the client audio application 140 operating under the Android system, and uses the VDI service controlled by the server terminal 200 which runs the server audio application 210, both applications require the audio device 110 for audio input/output. When the user chooses to operate on the desktop of the Android system, the client OS sound system 130 decides to play audio of the client audio application 140 via the audio device 110 while muting the audio of the server audio application 210. When the user chooses to operate on the VDI desktop, the client OS sound system 130 decides to play audio of the server audio application 200 via the audio device 110 while muting the audio of the client audio application 140. For a USB audio device, when the user switches the operating OS, e.g. from the server OS to the client OS, a real USB audio device must go through a USB device unplug and plug-in process (can be done by software) which takes seconds to unload/load the USB driver. When the OS is switched, the server audio application 210 is shut down because the USB audio device is no longer plugged-in (or redirected) to the server terminal 200. When the OS is switched back again, the server audio application 210 will not be running anymore, causing inconvenience to the user. The audio device 110, however, is an SOC audio device rather than a USB device. There is no USB host controller driver for a USB audio device installed in the client terminal 100; instead, there is a virtualized USB audio device for completing the USB redirection. Without the USB device plug-in and unplug process, when the OS is switched, the server audio application 210 will be muted rather than being shut down. Therefore, when the OS is switched back again, the user can use the server audio application 210 immediately. The user can thereby switch the desktop between the client OS and the server OS arbitrarily without resulting in any audio input/output trouble, and the client OS sound system 130 can selectively play one of the audio of the client audio application 140 and the server audio application 210 and mute the other audio according to which desktop of the system is used by the user. By virtualizing the audio device 110 as a virtual USB audio device on the client terminal 100 and using the computing power of the client terminal 100 for some computing tasks, the burden of the server terminal 200 can be greatly relieved, especially when a plurality of client terminals connects to the server terminal 200 for the VDI service.

Figure 2:
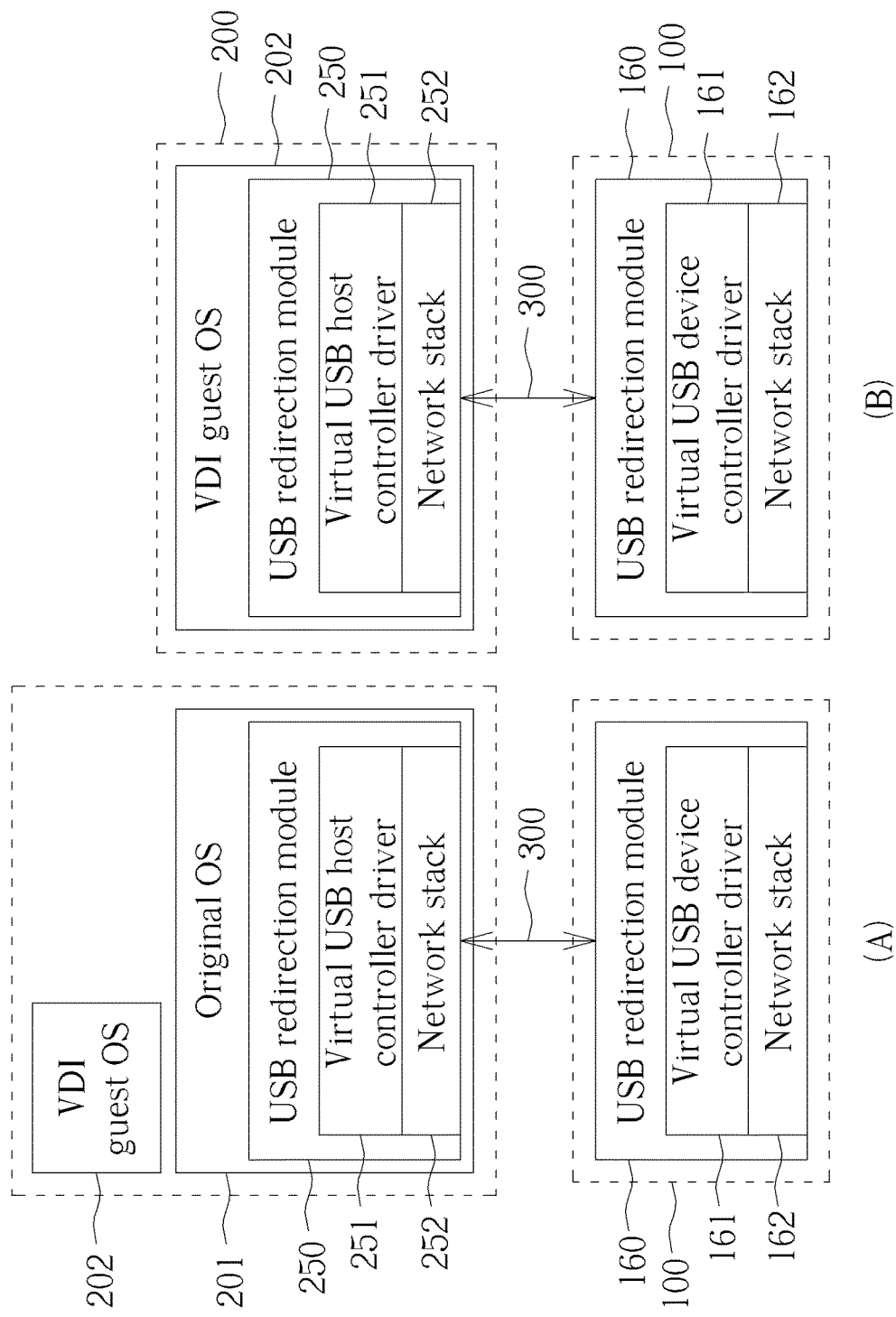
FIG. 2 is a diagram illustrating an original OS and a VDI guest OS of the server terminal according to an embodiment of the present invention.

The modules described above in the server terminal 200 of the audio device redirection system 10 are not limited to be implemented in the original OS of the server terminal 200 but can also be implemented in a guest OS connecting to the client terminal 100 for the VDI service. FIG. 2 is a diagram illustrating an original OS 201 and a VDI guest OS 202 of the server terminal 200 according to an embodiment of the present invention. As shown in the sub-diagram (A) of FIG. 2, the modules (only the USB redirection module 250 is depicted here for brevity) of the server terminal 200 described in the embodiment of FIG. 1 are implemented in the original OS 201 of the server terminal 200. In this way, when a plurality of the client terminals connect to the server terminal 200 for the VDI service and each client terminal redirects its USB (or virtual USB) devices to the server terminal 200, the original OS 201 of the server terminal 200 might not be able to accurately recognize each USB device group and its corresponding client terminal. Referring to the sub-diagram (B) of FIG. 2, the modules (only the USB redirection module 250 is depicted for brevity) of the server terminal 200 described in the embodiment of FIG. 1 are implemented in a VDI guest OS 201 corresponding to the client terminal 100. The VDI guest OS 201 can be regarded as a virtual machine which is only for the VDI service with the client terminal 100. The USB (or virtual USB) devices of the client terminal 100 are redirected to the VDI guest OS 201 of the server terminal 200 via the network interface 300 to simplify and avoid the recognition issue described above.

Figure 3:
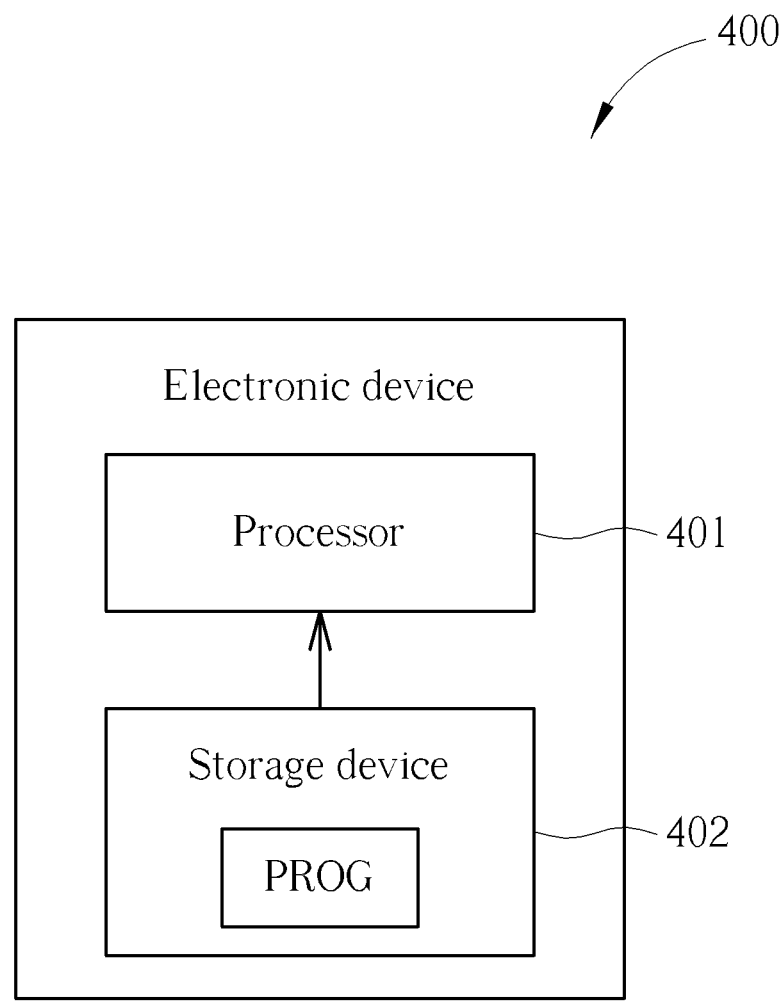
FIG. 3 is a diagram illustrating an electronic device according to an embodiment of the present invention.

FIG. 3 is a diagram illustrating an electronic device 400 according to an embodiment of the present invention. The electronic device 400 can be implemented by the client terminal 100. The electronic device 400 comprises a processor 401 and a storage device 402 comprising a program code PROG. The storage device 402 can further comprise the client OS sound system 130 and the client audio application 140 (not shown in FIG. 3). The program code PROG of the storage device includes the virtual USB audio device module 150 and the USB redirection module 160 of the client terminal 100 when implemented by software, and when loaded and executed by the processor 401 of the electronic device 400, the program code instructs the processor to perform the functions of those modules described above. Those skilled in the art should readily understand the detailed implementation after reading the paragraphs above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A client terminal of an audio device redirection system, comprising:
    a storage device, arranged to store a program code, a client operating system (OS) sound system and a client audio application; and
    a processor, wherein when loaded and executed by the processor, the program code instructs the processor to perform the following steps:
        virtualizing a specific audio device of the client terminal as a virtual USB audio device on the client terminal, wherein the specific audio device is arranged to extract/output an audio signal, and the specific audio device does not correspond to a USB protocol;
        redirecting the virtual USB audio device to a server terminal of the audio device redirection system for a virtual desktop infra-structure (VDI) service via a network interface based on a USB redirection protocol; and
        when the client audio application and a server audio application of the server terminal are both launched, using the client OS sound system running on the processor to select one of audio data of the client audio application and the server audio application to be played or recorded via the specific audio device of the client terminal, and muting the other audio data of the client audio application and the server audio application.

2. The client terminal of claim 1, wherein the program code comprises:
    a USB device core driver, arranged to respond to a USB host core driver of the server terminal to finish an initialization of the virtualized USB audio device.

3. The client terminal of claim 1, wherein the program code comprises:
    a USB audio function driver, arranged to receive an audio output data from a USB audio class driver of the server terminal and transmit an audio input data to the server terminal based on a USB audio data format.

4. The client terminal of claim 3, wherein the program code further comprises:
    an audio interface bridging module, arranged to receive the audio output data from the USB audio function driver and transfer it to client OS sound system, and grab the audio input data from client OS sound system and transfer it to the USB audio function driver.

5. The client terminal of claim 4, wherein a USB host core driver of the server terminal is arranged to initialize the virtual USB audio device and manage USB Request blocks (URBs) sent by the USB audio class driver of the server terminal, and the USB audio class driver is arranged to input or output the audio data based on the USB audio data format.

6. The client terminal of claim 1, wherein the program code comprises:
    a client network stack, arranged to communicate with a server network stack of the server terminal via the network interface based on the USB redirection protocol; and
    a virtual USB device controller driver, arranged to respond to a USB input request or a USB output request sent from a virtual USB host controller driver of the server terminal of the audio device redirection system.

7. The client terminal of claim 6, wherein the server network stack and virtual USB host controller driver are comprised in a server OS of the server terminal.

8. The client terminal of claim 6, wherein the server network stack and the virtual USB host controller driver are comprised in a VDI guest OS of the server terminal.

9. An audio device redirection method of a client terminal, comprising:
   storing a client operating system (OS) sound system and a client audio application;
   virtualizing a specific audio device of the client terminal as a virtual USB audio device on the client terminal, wherein the specific audio device is arranged to extract/output an audio signal, and the specific audio device does not correspond to a USB protocol;
   redirecting the virtual USB audio device to a server terminal of the audio device redirection system for a virtual desktop infra-structure (VDI) service via a network interface based on a USB redirection protocol;
   when the client audio application of the client terminal and a server audio application of the server terminal are both launched, running the client OS sound system on the client terminal to select one of audio data of the client audio application and the server audio application to be played or recorded via the specific audio device of the client terminal, and mute the other audio data of the client audio application and the server audio application.

10. The audio device redirection method of claim 9, further comprising:
    executing a USB device core driver to respond to a USB host core driver of the server terminal to finish an initialization of the virtualized USB audio device.

11. The audio device redirection method of claim 9, further comprising:
    executing a USB audio function driver to receive an audio output data from a USB audio class driver of the server terminal and transmit an audio input data to the server terminal based on a USB audio data format.

12. The audio device redirection method of claim 11, further comprising:
    executing an audio interface bridging module to receive the audio output data from the USB audio function driver and transfer it to client OS sound system, and grab the audio input data from client OS sound system and transfer it to the USB audio function driver.

13. The audio device redirection method of claim 12, wherein a USB host core driver of the server terminal is arranged to initialize the virtual USB audio device and manage USB Request blocks (URBs) sent by the USB audio class driver of the server terminal, and the USB audio class driver is arranged to input or output the audio data based on the USB audio data format.

14. The audio device redirection method of claim 13, further comprising:
    executing a client network stack to communicate with a server network stack of the server terminal via the network interface based on the USB redirection protocol; and
    executing a virtual USB device controller driver to respond to a USB input request or a USB output request sent from a virtual USB host controller driver of the server terminal of the audio device redirection system.

15. The audio device redirection method of claim 14, wherein the server network stack and the virtual USB host controller driver are comprised in a server OS of the server terminal.

16. The audio device redirection method of claim 14, wherein the server network stack and the virtual USB host controller driver are comprised in a VDI guest OS of the server terminal.

* * * * *